July 19, 1966  J. D. PETRIE  3,261,344
PORTABLE BARBECUE AND CAMP COOKER
Filed Oct. 19, 1964
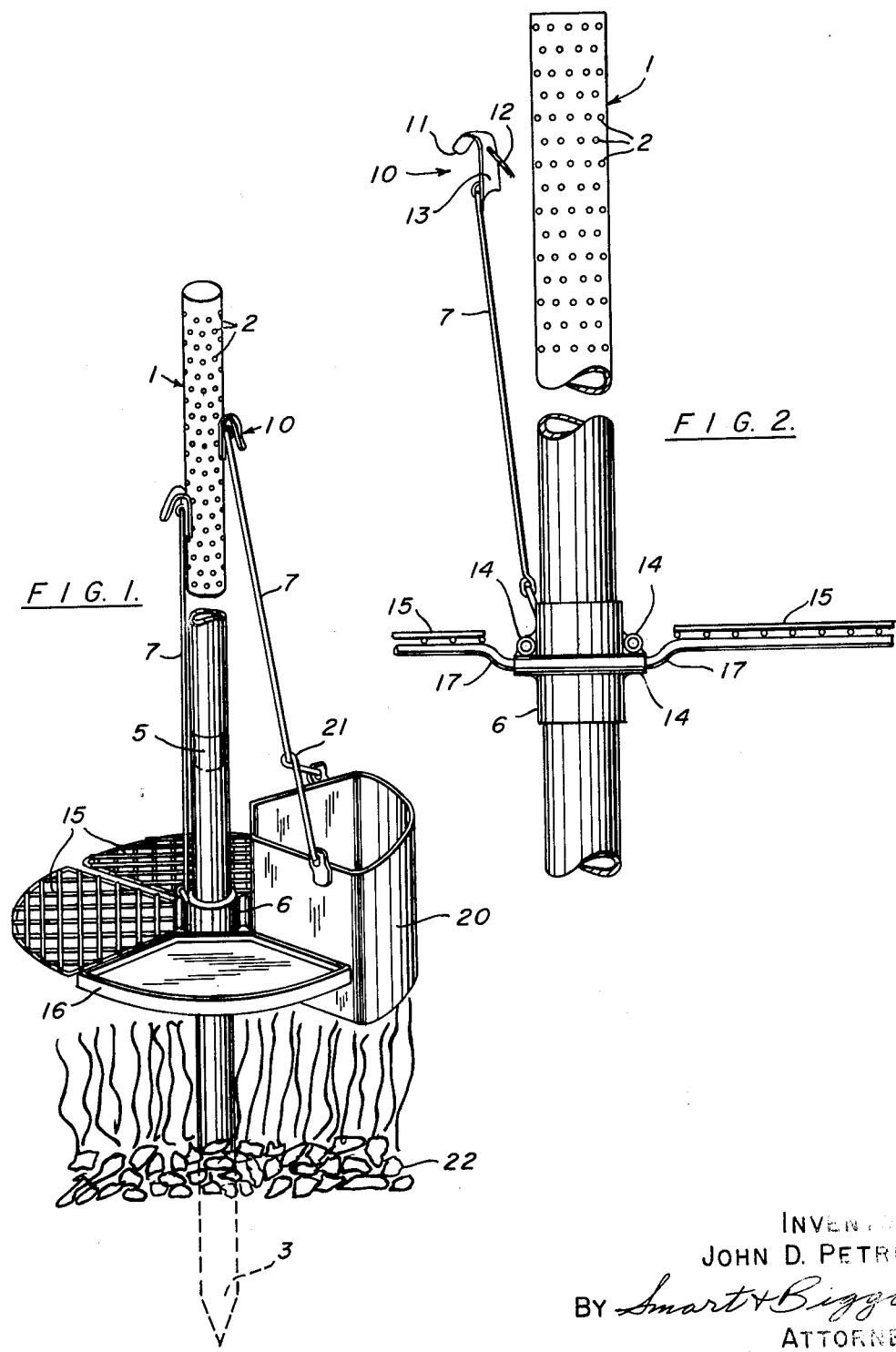
INVENTOR
JOHN D. PETRIE
BY Smart & Biggar
ATTORNEYS.

3,261,344
PORTABLE BARBECUE AND CAMP COOKER
John D. Petrie, 3641 9th St. SW., Calgary,
Alberta, Canada
Filed Oct. 19, 1964, Ser. No. 404,762
Claims priority, application Canada, Oct. 25, 1963,
887,618
6 Claims. (Cl. 126—30)

This invention relates to a portable cooking stand for use in picnicing, camping, etc.

The invention is particularly directed to a cooking stand which may be readily assembled and disassembled, which takes up a minimum of storage space and which may be easily erected on the terrain found at the usual camp site. In addition to these features it is also important that the cooking elements associated with the cooking stand be readily adjustable both vertically and horizontally to vary their relationship with the cooking fire.

There is a wide variety of portable cooking stands in common use which exhibit certain of the aforementioned features. However, these known types of cooking stands all suffer from the same disadvantage, that is, when a fire is kindled under the cooking element associated with the cooking stand, the cooking element cannot be adjusted without the danger of the person manipulating the cooking element burning his hands or fingers. This results from the fact that the adjustability of the cooking element of known cooking stands is generally regulated by means of a set screw which may be loosened and tightened to permit the cooking elements to be moved and positioned on a single cooking element support pole. As the set screw is at the same level as the cooking element it is subjected to the heat of the fire with the result that it cannot be touched or manipulated by a person using the equipment after the fire has been kindled. In addition, because of the nature of the adjusting apparatus it is not possible to manipulate the set screw and simultaneously adjust the cooking element by a simple and convenient tool.

I have found that these disadvantages may be overcome by providing a portable cooking stand comprising, a supporting post adapted to be maintained in an upright position, a plurality of apertures in the upper portion of said supporting post, a collar adapted to be slidably and rotatably mounted on said supporting post, means selectively engageable with said apertures whereby to adjust the position of said collar, at least one bearing member on said collar, and a cooking element supportable by said bearing member. As the cooking element of such a cooking stand is readily adjusted by the manipulation of means engageable with apertures which are located at the upper portion of the supporting post, and thus well away from the fire and the cooking element, adjustments to the cooking element may be made even when a fire has been kindled. This is a great advantage in cooking since, if it is found that the fire is too hot, the cooking element may simply be raised slightly to reduce the heat of the fire on the food being cooked. This adjustability of the cooking element after the fire has been kindled constitutes a decided advantage over known devices since in the known devices it is not a simple matter to vary the heat produced by the fire, and in particular reduce the heat produced by the fire, as is necessary when the cooking element itself cannot be adjusted.

In the drawings which illustrate embodiments of the invention,

FIGURE 1 is a pictorial representation of the portable cooking stand of the invention, and FIGURE 2 is a side elevation showing details of the construction of the cooking stand.

Referring now to the drawings it will be seen that the illustrated embodiment includes a centre post 1 having a plurality of apertures 2 spirally arranged about the upper portion thereof. The centre post may be either a solid or a hollow tubular member, although preferably it will be hollow in order to reduce its weight. The lower end of the post is formed to a point 3 to facilitate the insertion of the post into the ground. As the centre post may be in the order of four feet long it may be comprised of one or more sections joined together in a suitable manner such as by a plug and socket connection indicated generally at 5. This will permit the centre post to be disassembled to facilitate its transportation.

Slidably and rotatably mounted on the centre post is a collar 6 to the upper end of which is attached a wire or cable 7 which is connected at its other end to a positioning hook designated generally as 10. The positioning hook has a finger receiving portion 11, a pin 12 projecting from the side opposite the finger receiving portion, and a skirt portion 13 which conforms generally to the peripheral surface of the centre post 1.

The collar 6 is further provided with suitable bearing members which may take the form of two pairs of parallel tubular members 14 depicted in FIGURE 2 of the drawings. These bearing members may be fixed to the collar in any suitable manner, as by welding. The collar supports suitable cooking elements, such as the grates 15 or the grill 16, which are provided with offset projecting support members 17 adapted to be received in the tubular bearing members 14 and each cooking element has preferably the outline of a quarter circle so that a continuous circular cooking surface may be provided about the centre post 1 in the manner illustrated in FIGURE 1 of the drawings. As will be seen from FIGURE 2 of the drawings, each pair of bearing members supports two cooking elements on opposite sides of the centre post.

In place of the cooking grate or grill, a cooking element such as the suitably shaped container 20 may be used as illustrated in FIGURE 1. In this case, the container 20 is suspended by means of adjusting hook 10 and wire or cable 7 which is connected to the container by a suitable fastening means 21. The provision of such a utensil facilitates the boiling of water and the cooking of vegetables and the like.

The use of the portable camp cooker will be readily apparent from the drawings and the above description. If the centre post is in one or more sections, the sections are first put together and the pointed end 3 is inserted into the ground. The collar 6 is then slid down the centre post and adjusted in position at a suitable height above the ground. The plurality of spirally arranged apertures 2 in the upper portion of the centre post permit the adjustment of the collar both vertically and rotatably about the longitudinal axis of the centre post by means of the positioning hook 10. When the collar is fixed in a suitable position by inserting the pin 12 into one of the apertures 2, the support members 17 of the grates or grills are then inserted into the bearing members 14 and, if desired, a container 20 may be suspended in position as was done in the case of the collar. A fire 22 may then be kindled about the centre post which is of fire-proof material and the portable camp cooker is ready for the cooking of food. If it should happen that the grates or grill have been placed too low and that the heat of the fire is excessive, the cooking elements may be raised simply by lifting the pin 12 out of the aperture in which it is situated by means of the finger hook 11 and raising the collar slightly until the heat is suitable. The pin 12 is then inserted into a higher aperture to fix the collar in this position.

What I claim as my invention is:

1. A portable cooking stand comprising, an upstanding supporting post, a collar slidably and rotatably mounted on said supporting post, means attached to said collar and adjustably engageable with the upper portion of said post whereby to adjustably support said collar in a position below said means, at least one bearing member on said collar, and a cooking element supportable by said bearing member.

2. A portable cooking stand as defined in claim 1, wherein said means is engageable with said supporting post over a portion thereof remote from the heat of a cooking fire and wherein said collar is positioned below said means within the heat produced by such fire.

3. A portable cooking stand comprising, an upstanding supporting post, a plurality of apertures in the upper portion of said supporting post, a collar slidably and rotatably mounted on said supporting post below said apertures, means attached to said collar and selectively engageable with said apertures whereby to adjust the position of said collar, at least one bearing member on said collar, and a cooking element supportable by said bearing member.

4. A portable cooking stand comprising, an upstanding centre post, a plurality of spirally arranged apertures in the upper portion of said post, a collar slidably and rotatably mounted on said centre post below said apertures, means attached to said collar and selectively engageable with said apertures whereby to vertically and rotatably adjust the position of said collar, at least one bearing member on said collar, and a cooking element supportable by said bearing member.

5. A portable cooking stand as defined in claim 3 wherein said means selectively engageable with said apertures comprises a substantially flat member having a hooked finger receiving portion extending from one face thereof, an aperture engaging pin extending from the opposite face thereof and flexible fire resistant means interconnecting said flat member and said collar.

6. A portable cooking stand as defined in claim 3 wherein said bearing means comprises a pair of parallel horizontally disposed tubular members affixed tangentially to opposite sides of said collar.

References Cited by the Examiner
UNITED STATES PATENTS

| | | | |
|---|---|---|---|
| 2,857,862 | 10/1958 | Dwyer | 126—30 X |
| 3,067,734 | 12/1962 | Lucas | 126—30 |

FREDERICK MATTESON, Jr., *Primary Examiner.*

E. G. FAVORS, *Assistant Examiner.*